United States Patent [19]
Anderson et al.

[11] Patent Number: 5,949,160
[45] Date of Patent: Sep. 7, 1999

[54] SYSTEM AND METHOD FOR DOUBLE FAULT PROTECTION WITHIN A DIGITAL CAMERA DEVICE

[75] Inventors: Eric C. Anderson, San Jose; Scott F. Fullam, Mountain View, both of Calif.

[73] Assignee: Apple Computer, Inc., Cupertino, Calif.

[21] Appl. No.: 08/858,224

[22] Filed: Oct. 8, 1996

[51] Int. Cl.[6] .................................................. H01H 3/26
[52] U.S. Cl. ...................... 307/140; 439/188; 200/51.09; 307/113; 307/147
[58] Field of Search .......................... 439/188; 200/51 R, 200/51.05, 51.09, 51.1, 51.13; 307/112, 113, 139, 140, 147

[56] References Cited

U.S. PATENT DOCUMENTS

| | | | |
|---|---|---|---|
| 4,358,135 | 11/1982 | Tsuge et al. | 280/806 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,530,296 | 6/1996 | Masaki | 307/75 |

*Primary Examiner*—Jeffrey Gaffin
*Assistant Examiner*—Jonathan Kaplan
*Attorney, Agent, or Firm*—Carr & Ferrell LLP; Gregory J. Koerner

[57] ABSTRACT

The invention comprises a battery coupled to a power bus, an external power connector coupled to the power bus for receiving an external power plug, and two switching devices for disconnecting the battery from the power bus when the external power plug is coupled to the connector. The battery supplies power to the camera unless the external power plug is coupled to the connector. Upon coupling of the external power plug to the connector, the two switching devices, which are positioned in series between the negative terminal of the battery and the system ground, are opened. The opening of the two switching devices disconnects the battery from the power bus and connector to prevent damage which could be caused by applying an externally supplied voltage from the external power plug across the positive and negative terminals of the battery.

15 Claims, 4 Drawing Sheets

SYSTEM AND METHOD FOR DOUBLE FAULT PROTECTION WITHIN A DIGITAL CAMERA DEVICE

CROSS-REFERENCE TO RELATED APPLICATIONS

This application relates to co-pending U.S. patent application Ser. No. 08/666,241, entitled "System And Method For Using A Unified Memory Architecture To Implement A Digital Camera Device," filed on Jun. 20, 1996, and also to issued U.S. Pat. No. 5,784,629, entitled "System And Method For Conserving Power Within A Backup Battery Device," which are hereby incorporated by reference.

BACKGROUND OF THE INVENTION

1. Field of the Invention

This invention relates generally to power supply systems and more particularly to a system and method for providing double fault protection within a digital camera device.

2. Description of the Background Art

Product safety and reliability are important considerations of designers, manufacturers and product users. Electronic power supply devices are particularly important areas for such product safety and reliability considerations. Portable electronic products may receive operating power from an internal battery or an external power supply. When a single portable electronic device (such as a digital camera) alternately uses both an internal battery and an external power supply, the safe operation of the digital camera may merit additional safeguards. Therefore, product designers may wish to include a second backup safeguard device to protect against possible failure to the primary safeguard device. This practice of adding a second duplicate safeguard device is known as "double fault protection."

Referring now to FIG. 1, a schematic of a conventional double fault circuit is shown. Battery 10 provides operating power from positive terminal 12 through diode 16 to the DC input of the device power supply (not shown) via line 18. The negative terminal 20 of battery 10 is connected to line 22 which is connected to switch 26 by line 24. When switch 26 is closed, line 24 is connected to ground 30 via line 28. The battery circuit is thus completed and current flows to supply operating power to the device power supply.

However, if external power is connected to external power connector 32, then battery 10 must be disconnected from the FIG. 1 circuit, so that the external power is not applied directly across the terminals of battery 10. If the external power is applied directly across terminals 12 and 20 of battery 10, then a danger exists that battery 10 could overheat and possibly rupture, thereby endangering the device and device users.

In the FIG. 1 design, an external power source may be connected to external power connector 32 using a conventional barrel plug 50 having an internal positive terminal 52 and an external negative terminal 54. If the plug is inserted, then external power connector 32 provides operating power from positive terminal 36, via line 38, through diode 40, to line 18 which connects to the device power supply. Negative terminal 34 connects to ground 30 via line 28, to complete the circuit and allow operating power to flow to the device power supply.

Inserting the external power plug 50 into external power connector 32 also opens switch 26 to disconnect battery 10 from the FIG. 1 circuit. In addition, diode 16 provides double fault protection by becoming reverse-biased when a higher external voltage is present on line 42, thus effectively disconnecting battery 10 from the circuit. The FIG. 1 design thus requires failures (faults) in both switch 26 and diode 16 to connect the external power source directly across terminals 12 and 20 of battery 10.

In portable electronic devices (such as digital cameras), the conservation of battery power is another important design consideration. In the FIG. 1 circuit, a significant voltage drop is caused by diode 16 (the secondary fault protection device discussed above). This diode 16 voltage drop results in less available power from battery 10. Under heavy load conditions (such as charging an electronic flash in a digital camera), the problem is accentuated. As battery 10 discharges, the diode 16 voltage drop will accelerate a power failure condition in the powered device. Therefore, an improved system and method is needed for providing double fault protection within a digital camera device.

SUMMARY OF THE INVENTION

In accordance with the present invention, a system and method are disclosed for providing double fault protection within a digital camera device. In the preferred embodiment of the present invention, a set of main batteries generate an internal supply voltage. The main batteries are coupled directly to a power bus which supplies operating power to a power supply unit.

An external power connector is also coupled to the power bus. An external power plug may thus be selectably inserted into the external power connector to provide an external supply voltage. A first and a second switching device are positioned in series between the negative terminal of the main batteries and system ground. If the external power plug is inserted into the external power connector, then the physical size and shape of the external power plug cause the first and second switches to open. The present invention thus effectively disconnects the main batteries from the power bus and the external power connector to prevent possible damage caused by applying the externally-supplied voltage across the positive and negative terminals of the main batteries.

The present invention also provides double fault protection because both the first and second switches would have to fail simultaneously for the externally supplied voltage to be applied across the positive and negative terminals of the main batteries. Furthermore, the present invention allows the positive terminal of the main batteries to be connected directly to the power supply unit, thereby avoiding the power drop typically encountered when the system design uses a conventional diode device to achieve double fault protection.

DETAILED DESCRIPTION OF THE PREFERRED EMBODIMENT

The present invention discloses a system and method for providing double fault protection within a digital camera device and comprises a battery which is coupled to a power bus to generate an internal supply voltage, an external power connector also coupled to the power bus, an external power plug which may selectably be inserted into the external power connector to provide an external supply voltage, and two switching devices in series for disconnecting the battery from the power bus when the external power plug is inserted.

Figure 2:
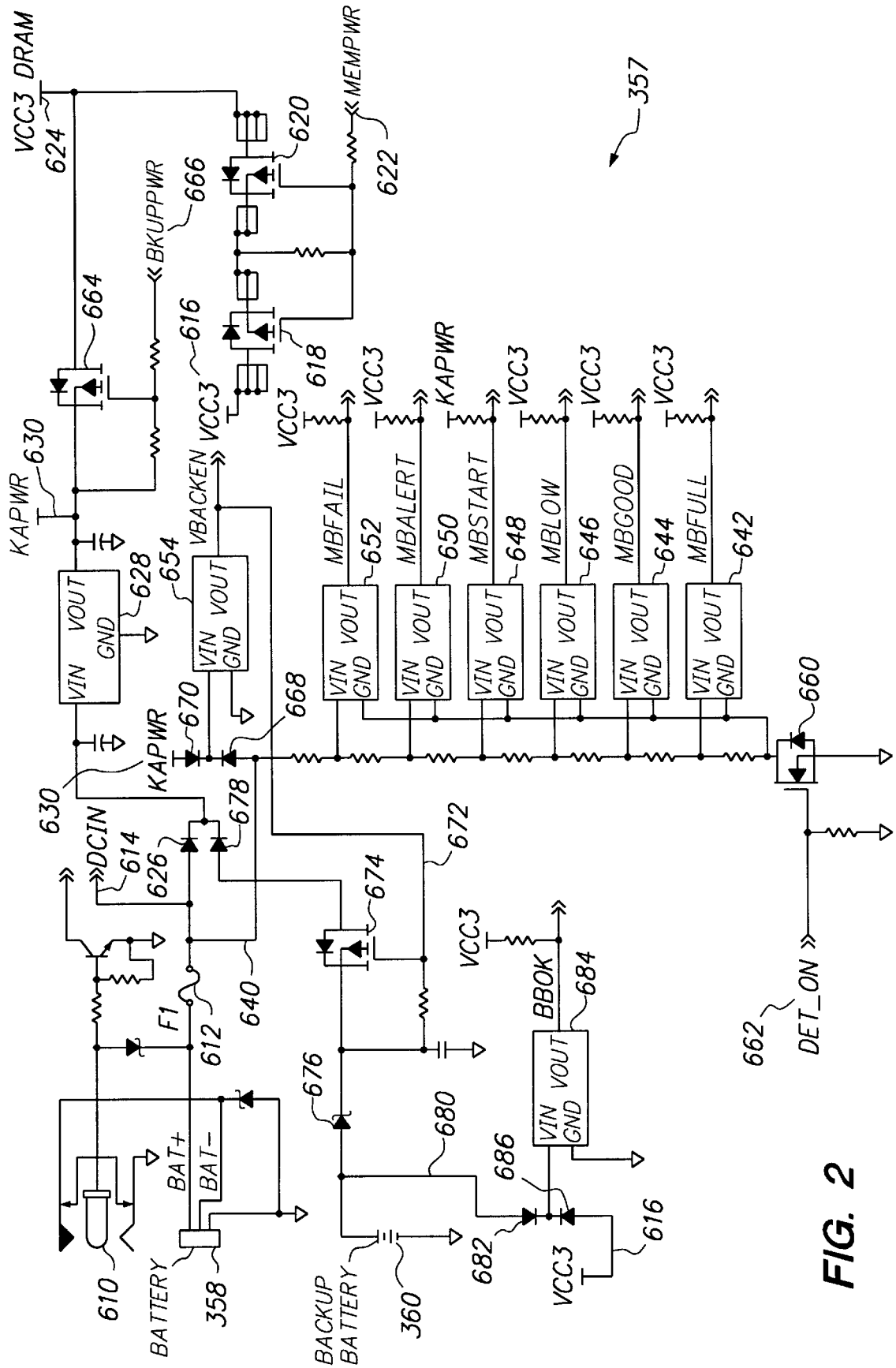
FIG. 2 is a schematic diagram of the preferred embodiment for a battery interface.

Referring now to FIG. 2, a schematic diagram of the preferred embodiment for battery interface 357 is shown. In the normal operation mode of the camera, main batteries 358 provide a main battery voltage through fuse 612 via line 614 to a camera power supply (not shown). External direct current (DC) power can also be connected to the camera via connector 610. Backup batteries 360 are disconnected in the normal operation mode by maintaining Field Effect Transistor (FET) switch 674 in a turned-off state.

The power supply responsively generates several supply voltages including voltage VCC3 (616). In normal operation mode, a camera power manager turns on complementary FET switches 618 and 620 via MEMPWR signal 622. Voltage VCC3 (616) is thus connected to VCC3 DRAM (624) which is routed to provide operating power to DRAM and a CPU in the camera.

The main battery voltage is also connected through diode 626 to voltage regulator 628 which provides a regulated Keep-Alive Power voltage (KAPWR) 630 to operate a power manager (not shown) and the real-time clock in a CPU (not shown). In normal operation mode, the power manager turns off FET switch 664 using BKUPWR signal 666.

The main battery voltage is provided via line 640 to voltage sensors 642 through 654 which are activated when FET switch 660 is turned on via DET_ON signal 662. In normal operation mod e, sensors 642 through 654 sense the main battery voltage level and notify the power manager when the main battery voltage reaches a series of decreasing threshold levels.

In the preferred embodiment, sensor 642 sends a MBFULL signal to the power manager when 7.4 volts are sensed. Sensor 644 sends a MBGOOD signal to the power manager when 6.8 volts are sensed, and sensor 646 sends a MBLOW signal to the power manager when 6.4 volts are sensed. Sensor 648 sends a MBSTART signal to the power manager when 6.0 volts are sensed, and sensor 650 sends a MBALERT signal to the power manager when 5.4 volts are sensed.

When sensor 652 senses a main battery voltage of 5.2 volts, a MBFAIL signal is sent to the power manager. In response, the power manager generates a powerfail interrupt, thus causing the CPU to perform a powerdown sequence which powers down the non-critical camera subsystems by removing power from the main power bus of the camera.

During a powerfail interrupt condition, the power manager determines whether captured image data is present within the DRAM of the camera by finding out whether a corresponding MSAVE bit has been set. If the MSAVE bit has been set, then the power manager turns on FET switch 664 using BKUPWR signal 666 and thereby connects the KAPWR 630 voltage to VCC3 DRAM (624) to provide power to the DRAM and the CPU. In a powerfail condition, the present invention thus preferably only powers the DRAM and the CPU when captured image data is present and must be protected.

The power manager simultaneously turns off FET switches 618 and 620 using MEMPWR signal 622 and thereby disconnects supply voltage VCC3 (616) from VCC3 DRAM (624). The complementary FET switches 618 and 620 are back-to-back "P" and "N" type FETs which prevent leakage from VCC3 DRAM (624) to supply voltage VCC3 (616) when the FET switches 618 and 620 are turned off.

After the power manager generates the powerfail interrupt, backup batteries 360 initially remain disengaged because FET switch 674 is turned off via the VBACKEN signal from voltage sensor 654. Main batteries 358 continue to provide a main battery voltage level to KAPWR 630 (to supply the power manager and the real-time clock in the CPU). If captured image data is present in the DRAM, main batteries 358 also supply VCC3 DRAM (624) (to power the DRAM and the CPU) via FET switch 664. The present invention thus fully utilizes the power in main batteries 358 and thereby conserves power in backup batteries 358.

Voltage sensor 654 senses the main battery voltage level via line 640 and diode 668. When the main battery voltage level reaches 4.5 volts, sensor 654 generates a VBACKEN signal which is sent to the power manager. The VBACKEN signal also turns on FET switch 674 via line 672 to connect backup batteries 360 to regulator 628 through diode 676, FET switch 674 and diode 678. Backup batteries 360 are thus engaged to provide a backup battery voltage when sensor 654 detects the main battery voltage level of 4.5 volts. Regulator 628 then responsively generates the regulated KAPWR voltage 630 which may also be provided via FET switch 664 to VCC3 DRAM (624) if captured image data is present in the DRAM.

Sensor 654 also receives voltage KAPWR 630 through diode 670 to maintain a voltage level on the sensor 654 input, even when the main battery voltage level drops to zero. This KAPWR 630 voltage level maintains the input of sensor 654 within its normal operating range and permits the normal functioning of sensor 654 if main batteries 358 cease functioning or are removed from the camera.

Sensor 684 detects the backup battery voltage level via line 680 and diode 682 and responsively sends a BBOK signal to the power manager until a threshold level of 5.0 volts is reached. Sensor 684 also receives VCC3 (616) through diode 686 to maintain a voltage level on the sensor 684 input, even when the backup battery voltage level drops to zero. This VCC3 (616) voltage level maintains the input of sensor 684 within its normal operating range and permits the normal functioning of sensor 684 if backup batteries 360 cease functioning or are removed from the camera.

Figure 3:
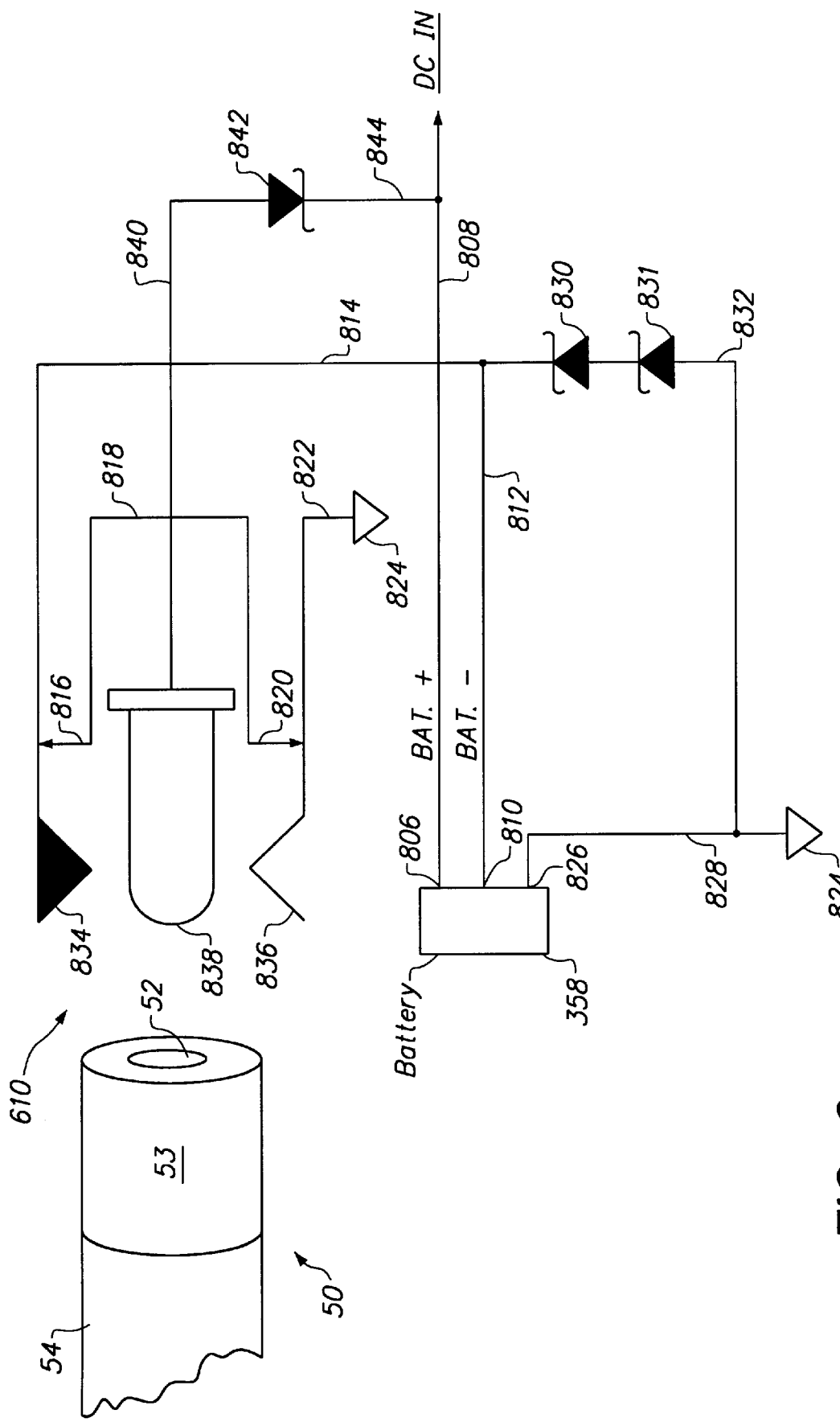
FIG. 3 is a schematic diagram of the preferred embodiment for the double fault protection circuit according to the present invention.

Referring now to FIG. 3, a schematic diagram of the preferred embodiment for the present invention is shown. The FIG. 3 circuit, including main batteries 358 and external power connector 610, is also depicted as part of the preceding FIG. 2. In FIG. 3, main batteries 358 provide operating power directly from positive terminal 806, via line 808, to the DC input of the digital camera power supply (not shown). The negative terminal 810 of main batteries 358 is connected to line 812 which is connected to a first terminal of switch 816 by line 814. The second terminal of switch 816 is connected, via line 818, to a first terminal of switch 820. The second terminal of switch 820 is connected to ground 824 via line 822. When switches 816 and 820 are closed, negative terminal 810 of main batteries 358 is thus is connected to ground 824 via lines 812 and 814, switch 816, line 818, switch 820 and line 822. The main batteries 358 circuit is thus completed and current flows to supply operating power to the power supply.

Main batteries 358 also have a charging terminal 826 which is connected directly to ground 824 via line 828 and also is connected to negative terminal 810 via lines 812 and 814, diodes 830 and 831, and lines 832 and 828. Between charging terminal 826 and negative terminal 810 (within main batteries 358) a trickle charge circuit (not shown) preferably may be included. The trickle charge circuit may include a diode and a resistor in series to limit the current which recharges main batteries 358.

An external power source may be connected to external power connector 610 by inserting a conventional barrel plug 50 into external power connector 610. The external power connector 610 may thus provide camera operating power from positive terminal 838, via line 840, to the positive terminal of diode 842. Line 844 then connects the negative terminal of diode 842 to line 808 which provides the external power to the power supply. Negative terminal 836 of external power connector 610 connects to ground 824 via line 822, to complete the circuit and allow operating power to flow from external power connector 610 to the power supply.

When the external power source is turned off, but still connected to external power connector 610, diodes 830 and 831 are forward-biased and diode 842 becomes reverse-biased to prevent main batteries 358 from discharging through external power connector 610. When the external power source is turned on, then diodes 830 and 831 become reverse-biased and diode 842 becomes forward-biased. In an alternate and preferred embodiment, diode 830 may be located across switch 816 (connected from line 814 to line 818) and diode 831 may be located across switch 820 (connected from line 822 to line 818).

Figure 1:
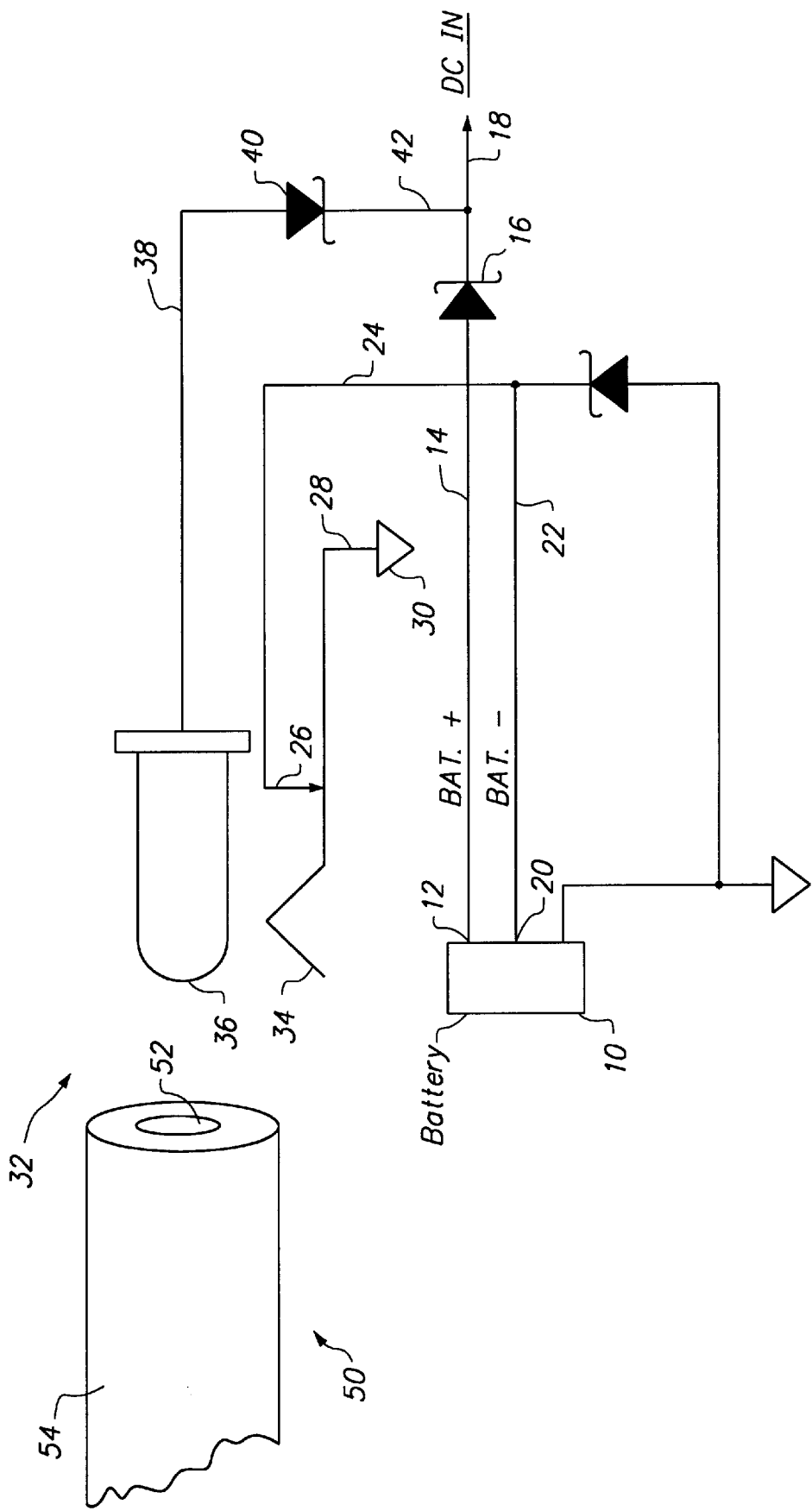
FIG. 1 is a schematic diagram of a conventional double fault protection circuit.

Inserting the external power plug 50 into external power connector 610 switches 816 and 820 to effectively disconnect main batteries 358 from the FIG. 3 circuit. The external power plug 50 is sized to open switches 816 and 820 upon insertion into external power connector 610. Thus, if external power plug 50 is inserted into external power connector 610, then external power plug 50 temporarily repositions insulated terminal 834 (causing switch 816 to open), and further temporarily repositions terminal 836 (causing switch 820 to open). The present invention therefore provides double fault protection by breaking the path between main batteries 358 (negative terminal 810) and ground 824 in two separate locations. Furthermore, the present invention provides double fault protection without the conventional fault protection diode (FIG. 1) which typically causes significant power loss to the powered device.

Figure 4:
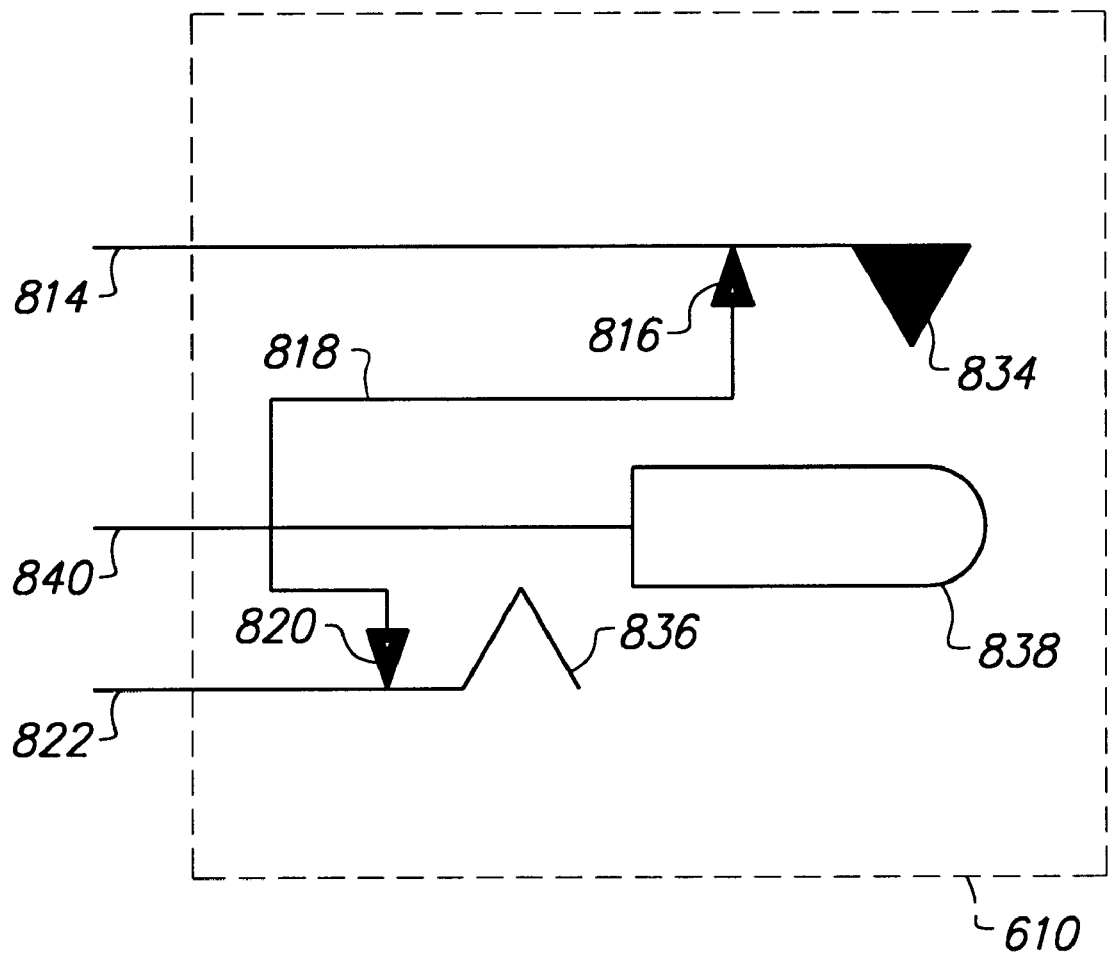
FIG. 4 is a schematic diagram of the preferred embodiment of the external power connector of FIG. 3.

Referring now to FIG. 4, a schematic diagram of the preferred embodiment of the FIG. 3 external power connector 610 is shown. External power connector 610 preferably becomes connected to an external power source when a camera user inserts the external power plug 50 (discussed above in conjunction with FIG. 3) into the external power source 610. The external power plug 50 preferably includes a positive terminal 52 located circumferentially within the external power plug and a negative terminal 54 located circumferentially around the outer surface of the external power plug.

Insulated terminal 834 of external power terminal 610 is covered with a non-conductive material to prevent electrical current from passing from the external power plug's negative terminal 54 to line 814. Both insulated terminal 834 and negative terminal 836 also possess a V-shaped surface for contacting the outer surface 54 of the external power plug in a "break-before-make" connection which insures that switches 816 and 820 are open before any power flows through external power connector 610. These V-shaped surfaces therefore cause switches 816 and 820 to open before terminals 834 and 836 make contact with the negative terminal 54 located on the exterior surface of external power plug 50.

In the preferred embodiment, if the camera user inserts the external power plug 50 into external power connector 610, then a preferred sequence of events occurs. Initially, the external power plug 50 contacts insulated terminal 834 to open switch 816 and provide one level of fault protection. The external power plug 50 typically also contacts positive terminal 838 during this time period. Subsequently, the external power plug 50 insulating sleeve 53 contacts negative terminal 836 to open switch 820 and provide a second (double) level of fault protection. Finally, negative terminal 836 makes contact with the metallic sleeve 54 on the external power plug to complete the circuit. The present invention thus completes the connection of the external power source to the camera and current begins to flow to the power supply.

The invention has been explained above with reference to a preferred embodiment. Other embodiments will be apparent to those skilled in the art in light of this disclosure. For example, the electrical components, such as the switches and connectors may be implemented using other devices which perform a similar function. Therefore, these and other variations upon the preferred embodiment are intended to be covered by the present invention, which is limited only by the appended claims.

What is claimed is:

1. A system for providing double fault protection, comprising:
    a battery for generating an internal supply voltage, said battery being coupled to a power bus and a plurality of diodes for voltage clamping said power bus;
    an external power connector, coupled to said power bus, for receiving an external power plug; and
    first and second switching devices connected in series from said battery from said power bus when said external power plug is inserted.

2. The system of claim 1 wherein a positive terminal of said battery is connected directly to said power bus.

3. The system of claim 1 wherein said first switching device and said second switching device are positioned between a negative terminal of said battery and a circuit ground potential.

4. A system for providing double fault protection, comprising:
    a battery for generating an internal supply voltage, said battery being coupled to a power bus and a plurality of diodes for voltage clamping said power bus;
    an external power connector, coupled to said power bus, for receiving an external power plug; and
    first and second switching devices connected in series for disconnecting said battery from said power bus when said external power plug is inserted, wherein said first switching device is activated by an insulated activation terminal prior to said second switching device.

5. The system of claim 1 further comprising a diode located between a positive terminal of said connector and said power bus, said diode preventing said battery from discharging into said external power supply.

6. A method for providing double fault protection, comprising the steps of:
    generating an internal supply voltage from a battery coupled to a power bus and a plurality of diodes for voltage clamping said power bus;

coupling an external power connector, to said power bus, for receiving an external power plug;

opening a first switching device to disconnect said battery from said power bus when said external power plug is inserted; and opening a second switching device to disconnect said battery from said power bus when said external power plug is inserted, said second switching device being in series with said first switching device.

7. The method of claim 6 wherein a positive terminal of said battery is connected directly to said power bus.

8. The method of claim 6 wherein said first switching device and said second switching device are positioned between a negative terminal of said battery and a circuit ground potential.

9. The method of claim 6 further comprising the step of locating a diode between a positive terminal of said connector and said power bus, said diode preventing said battery from discharging into said external power supply.

10. A method for providing double fault protection, comprising the steps of:

generating an internal supply voltage from a battery coupled to a power bus;

coupling an external power connector, to said power bus, for receiving an external power plug;

opening a first switching device to disconnect said battery from said power bus when said external power plug is inserted; and opening a second switching device to disconnect said battery from said power bus when said external power plug is inserted, said second switching device being in series with and activated subsequent to said first switching device.

11. A system for providing double fault protection, comprising:

means for generating an internal supply voltage coupled to a power bus and a plurality of diodes for voltage clamping said power bus;

means for connecting said power bus to an external power plug;

first means for disconnecting said means for generating from said power bus when said external power plug is inserted; and second means for disconnecting said means for generating from said power bus when said external power plug is inserted, said second means for disconnecting being in series with said first means for disconnecting.

12. The system of claim 11 wherein a positive terminal of said means for generating an internal supply voltage is connected directly to said power bus.

13. The system of claim 11 wherein said first means for disconnecting said means for generating an internal supply voltage and said second means for disconnecting said means for generating an internal supply voltage are positioned between a negative terminal of said means for generating an internal supply voltage and a circuit ground potential.

14. The system of claim 16 further comprising a diode located between a positive terminal of said means for connecting said power bus to an external power plug and said power bus, said diode preventing said means for generating an internal supply voltage from discharging into said external power plug.

15. A system for providing double fault protection, comprising:

means for generating an internal supply voltage coupled to a power bus;

means for connecting said power bus to an external power plug;

first means for disconnecting said means for generating from said power bus when said external power plug is inserted; and second means for disconnecting said means for generating from said power bus when said external power plug is inserted, said second means for disconnecting being in series with and activated subsequent to said first means for disconnecting.

\* \* \* \* \*

UNITED STATES PATENT AND TRADEMARK OFFICE
CERTIFICATE OF CORRECTION

PATENT NO : 5,949,160

DATED : September 7, 1999

INVENTOR(S): Eric C. Anderson et al.

It is certified that error appears in the above-identified patent and that said Letters Patent is hereby corrected as shown below:

Column 6, line 38, delete "from said battery" and insert therein -- for disconnecting said battery--.

Column 8, line 17, delete "16" and insert therein --11--.

Signed and Sealed this

First Day of February, 2000

Attest:

Attesting Officer

Q. TODD DICKINSON

Acting Commissioner of Patents and Trademarks